United States Patent [19]
Stevinson et al.

[11] 3,942,051
[45] Mar. 2, 1976

[54] SHOCK ACTUATED ELECTRICAL PULSE GENERATOR

[75] Inventors: Harry T. Stevinson; Douglas A. Baker, both of Ottawa, Canada

[73] Assignee: Canadian Patents and Development Limited, Ottawa, Canada

[22] Filed: Jan. 20, 1975

[21] Appl. No.: 542,366

[30] Foreign Application Priority Data
Feb. 13, 1974  Canada .................................. 192370

[52] U.S. Cl. .................................... 310/15; 310/30
[51] Int. Cl.² ........................................ H02K 33/00
[58] Field of Search ............................. 310/12–14, 310/15, 30, 25; 340/17

[56] References Cited
UNITED STATES PATENTS

| | | | |
|---|---|---|---|
| 3,130,332 | 4/1964 | Zehfeld et al. | 310/15 |
| 3,153,735 | 10/1964 | Branagan et al. | 310/15 |
| 3,736,448 | 5/1973 | Hebel, Jr. et al. | 310/15 |
| 3,774,058 | 11/1973 | Abel | 310/15 |

Primary Examiner—Donovan F. Duggan
Attorney, Agent, or Firm—James R. Hughes

[57] ABSTRACT

An electrical pulse generator comprising a closed magnetic circuit made up of permeable iron and permanent magnet material having a cup-shaped portion, a central rod shaped portion extending upwardly from the inside bottom of the cup portion and a generally flat disc-shaped removable keeper making contact with the cup-shaped portion and the upper end of the rod-shaped portion, an electric coil wound on a portion of said magnetic circuit such that on movement of the keeper away from the rest of the structure an electrical voltage pulse is generated in the coil, mechanical means such that on activation by a predetermined level of shock severity it forces the keeper away from the rest of the structure. In the preferred embodiment the keeper is at least two portions, the first of which is forced from the assembly by a first level of shock severity and the second portion by a second level of shock severity, the magnetic structure acts as its own inertial mass and is mounted in bearings in a cylindrical housing, with the bearings being in the form of continuous coil springs positioned in the annular space between the magnetic structure and the housing.

17 Claims, 10 Drawing Figures

SHOCK ACTUATED ELECTRICAL PULSE GENERATOR

This invention relates to an electrical pulse generator and more particularly to an energy storing and transducing device for use as a vehicle crash detector that will produce a strong electrical energy pulse whose energy increases with applied shock severity but which will discriminate against non-severe shocks.

At the present time there is a requirement for devices to prevent or minimize bodily injury to passengers in automobiles and other vehicles upon crashing. The device that is being proposed most strongly for this purpose is the inflatable air-bag which upon crash or rapid deceleration of the vehicle, inflates to partially envelope the passenger and cushion him against undue injury. These airbags are contained in storage compartments in the vehicle and must be inflated rapidly by means of a compressed gas bottle or propellant or both. The latter may be triggered or initiated by some form of accelerometer, signal processor and electrical switch associated with a seismic mass. These switch devices provide an electrical initiating signal to trigger the inflator but require access and connection to an electrical power supply circuit. Such switches and circuitry introduce many needless difficulties into such a system. Because of the short time involved (about 100 milliseconds from the start of the crash until the passenger's head or body makes contact with the windshield, dashboard, or steering wheel), the triggering device must be almost instantaneous. This and other reasons would seem to rule out the using of complete mechanical or hydraulic (i.e. non-electrical) systems.

The trigger device required must be such as to give a quick, powerful electrical pulse. In addition it would be preferable if the pulse generator required no power supply involving a battery and amplifying devices. Because the battery cable may be cut by the crash process before the sensor has decided that the crash will be severe these sensor systems must use an auxiliary power supply such as an electrical capacitor. During normal conditions short circuits may cause an inadvertent airbag inflation because the battery energy is available at least during all times of engine operation. The additional wires that run from the battery to a crash detector or sensor which may be placed well up front or even on the front bumper detracts seriously from the expected reliability over a long period and worse provides an additional fire hazard during or even some time after the crash.

Electrical pulse generators involving a closed magnetic circuit including a low reluctance structure, a permanent magnet, a removable keeper or armature, and with an electrical coil wound on the structure are known. These devices engender a voltage pulse in the coil when the keeper or armature is moved away from the other parts of the magnetic circuit. U.S. Pat. No. 2,813,998 entitled Mechanically Activated Source of Electrical Energy and issued to P. W. Griffin et al. on Nov. 19, 1957 describes a device of this nature. Other patents that describe devices of this general kind are U.S. Pat. Nos. 3,130,332; 3,537,050; 3,500,086; and 3,065,366.

It is an object of the present invention to provide a large current low voltage generator.

It is another object of the invention to provide a device that will convert vehicle crash energy into electrical energy.

It is another object of the invention to provide a crash detector that will ignore non-severe crashes and yet provide high energy electrical pulses during severe crashes. Shock severity is taken here to include both magnitude and duration.

It is another object of the invention to provide a device that will produce electrical pulses whose energy increases with shock severity beyond a predetermined shock severity.

It is another object of the invention to provide a device capable of rapidly resetting and providing more electrical pulses in the presence of repeated severe shocks or near severe shocks.

It is another object of the invnetion to provide a shock detector of the type having a keeper on a magnetic structure that will maintain a near zero magnetic gap unless severe shock is present to make high energy pulses possible and to avoid change of calibration by external magnetic fields.

It is another object of the invention to provide a device that has no moving parts in the presence of normal vehicle vibration and shock severities.

It is another object of the invention to provide a crash detector that will respond to axial components of shock and not change calibration in the presence of perpendicular components of shock.

It is another object of the invention to provide a device that is capable of pre-adjustment such as to respond to different shock severities on demand.

It is another object of the invention to provide a pulse generator that is very small, light and inexpensive.

It is another object of the invention to provide a device that is capable of providing electrical pulses suitable for use with staged inflation systems requiring two or more inflators to be initiated at different crash severity levels.

It is another object of the invention to provide a vehicle crash detector that is capable of operating while hermetically sealed against entry of salt spray and long term corroding agents.

These and other objects of the invention are achieved by an electrical pulse generator comprising a closed magnetic circuit made up of permeable iron and permanent magnet material having a cup-shaped portion, a central rod shaped portion extending upwardly from the inside bottom of the cup portion and a generally flat disc-shaped removable keeper making contact with the cup-shaped portion and the upper end of the rod shaped portion, an electric coil wound on a portion of said magnetic circuit such that on movement of the keeper away from the rest of the structure an electrical voltage pulse is generated in the coil, said keeper being in at least two portions, mechanical means such that on activation by a first level of shock severity forces a first portion of the keeper away from the rest of the structure and on a second level of applied shock severity forces a second portion of the keeper away from the rest of the structure. In the preferred embodiment the magnetic structure acts as its own inertial mass and is mounted in bearings in a cylindrical housing, with the bearings being in the form of continuous coil springs positioned in the annular space between the magnetic structure and the housing.

In drawings which illustrate an embodiment of the invention,

Figure 6:
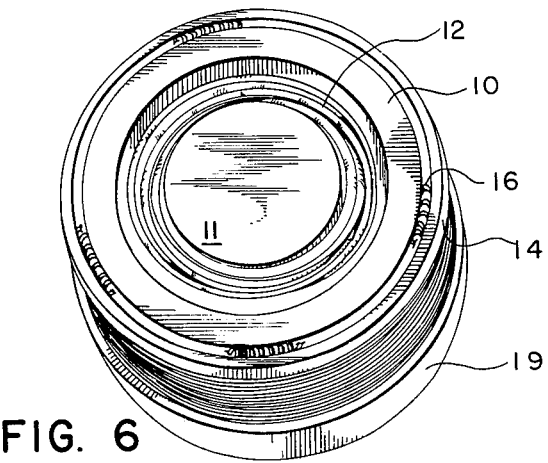
Figure 7:
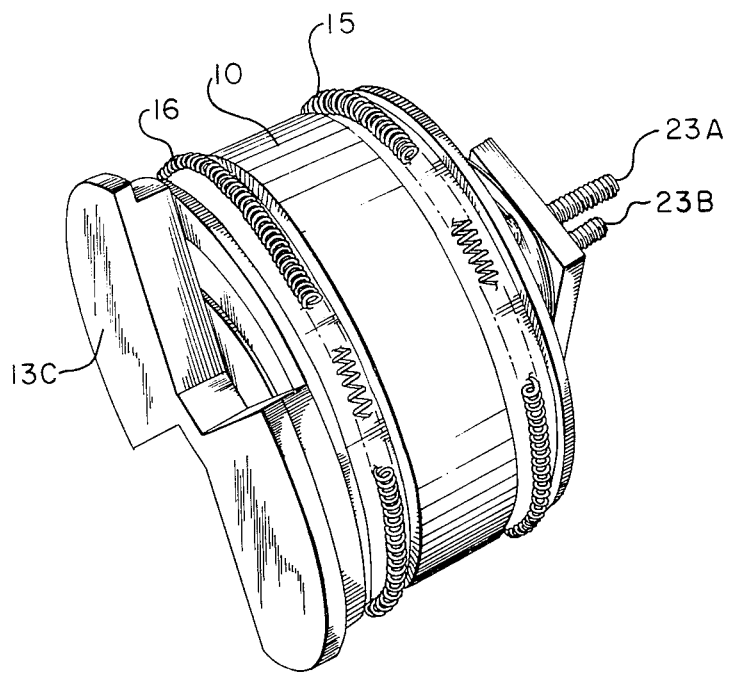
Figure 8:
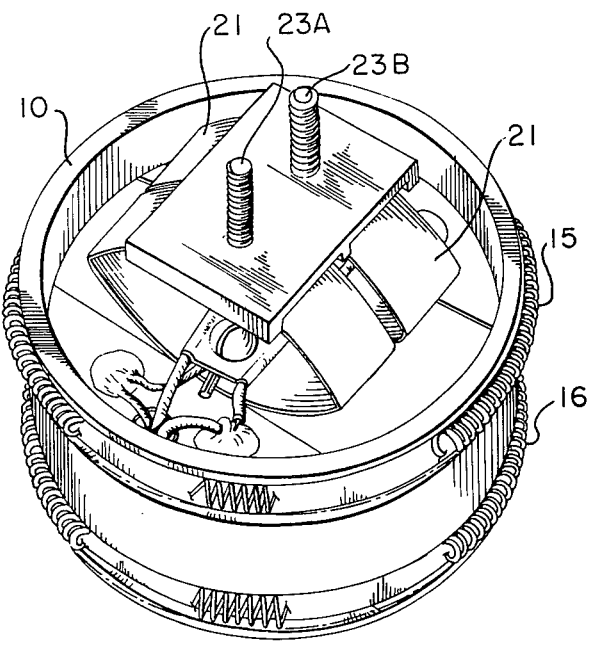
Figure 9:
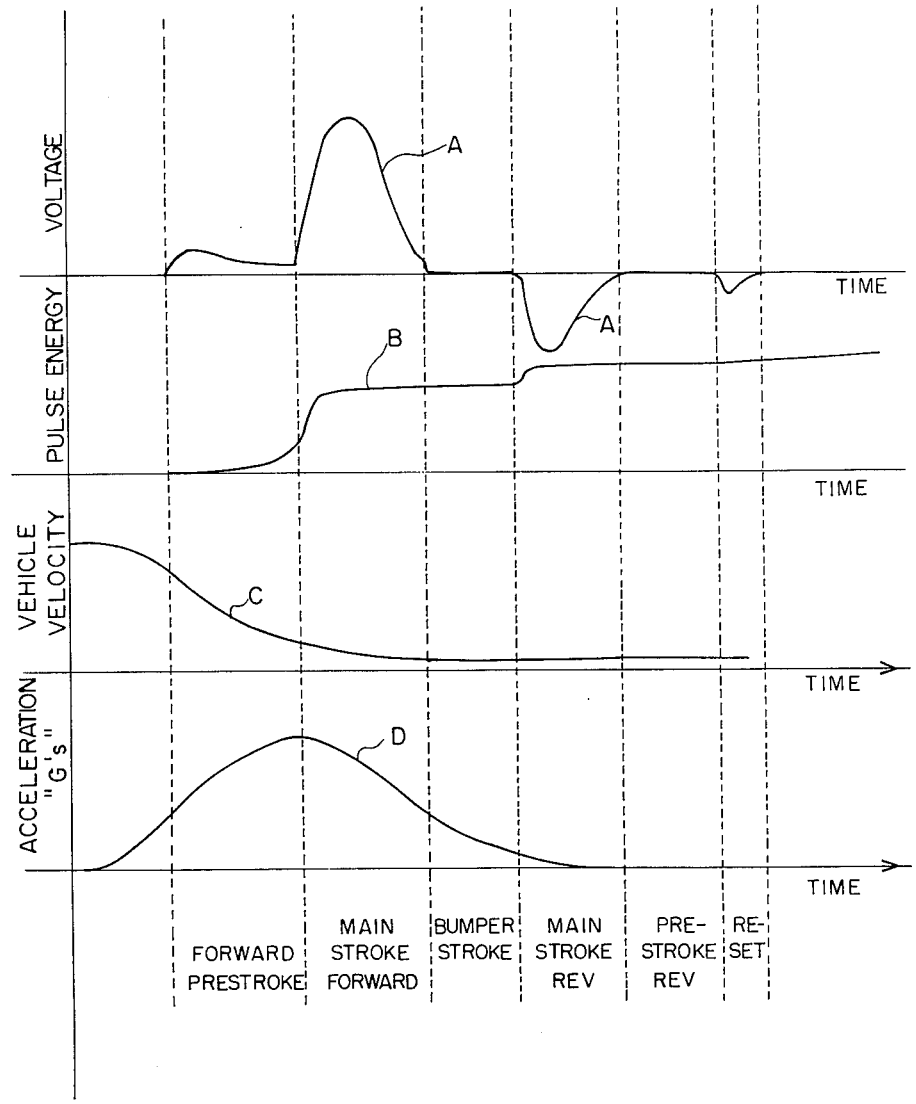
Figure 10:
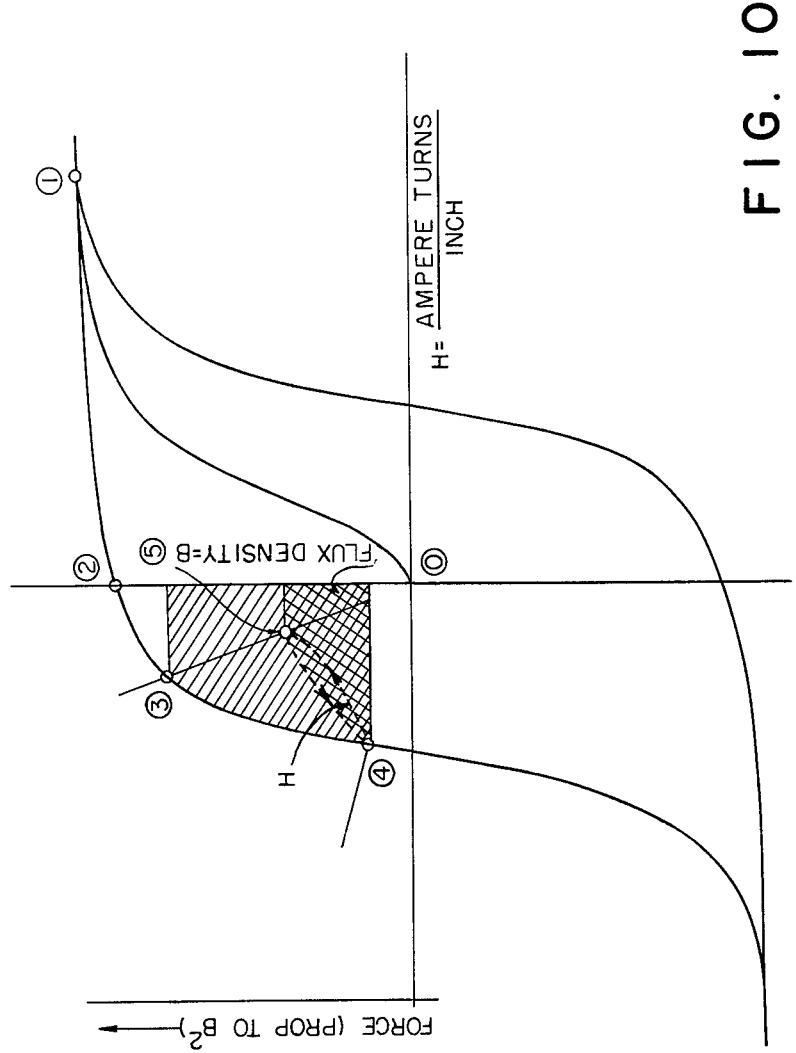

FIG. 6 is a three quarter view of the magnetic structure mounted in the housing, FIG. 7 is a view of the magnetic structure with a portion of the keeper in place, FIG. 8 is a view of the magnetic structure and the bearing springs and the current carrying pressure springs, FIG. 9 is a representative oscilloscope trace of the electrical and mechanical characteristics of the device, and FIG. 10 shows the hysteresis loop for the magnetic assembly.

Figure 1:
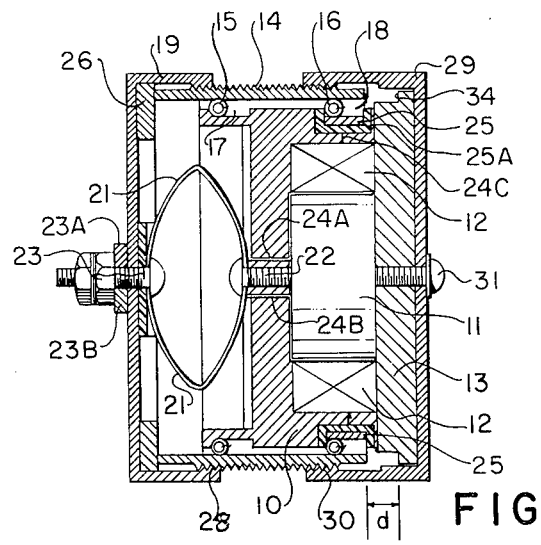
FIG. 1 is a longitudinal cross-section of the pulse generator assembly.
Figure 2:
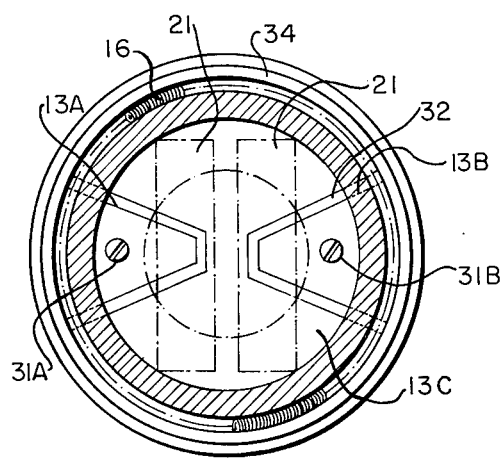
FIG. 2 is a transverse cross-section of the device of FIG. 1.

Referring to FIGS. 1 and 2, an annular magnetic structure is formed of a generally cup-shaped pole piece 10. Mounted centrally on this structure is a permanent magnet 11 and an electrical coil 12 encircles the permanent magnet. A keeper assembly 13 makes good contact with the tip of the structure 10 and the outer surface of magnet 11 and in effect closes the magnetic path formed by these elements. It is preferred that the surfaces are such as to provide a gap that in effect approaches a "zero gap." A movement of the keeper away from the magnetic structure would induce a voltage in coil 12. Magnetic structure 10 is mounted in a cylindrical housing 14 by means of roller bearings 15 and 16. These take the form of two endless coil springs which are designated as garter springs hereinafter. These springs are positioned in annular slots 17 and 18 which allow easy relative motion in the axial direction between structure 10 and housing 14 over a certain distance as defined by the ends of the annular slots 17 and 18.

A first end housing 19 is attached to structure 10 in a suitable manner and shown here as a threaded connection 28. A return spring 21 in the form of two leaf springs is attached to structure 10 by a bolt 22 and to end housing 19 by bolt 23. This spring serves to provide a back force on structure 10 for motion towards housing 19. In addition, the electrical leads 24a, 24b from coil 12 are connected to the two halves of the spring 21 which are electrically connected to external electrical terminals 23a and 23b. For some applications it may be necessary to have more than one coil in which case it will be necessary to bring the electrical outputs of these to the exterior. This arrangement allows rugged, shockproof, and convenient transfer of the electrical output of the coil to the exterior. The garter springs can also be used to carry current to the exterior. Electrical lead 24c passes through the assembly and insulator 25a to ring 25. The leaf springs are chosen of a material that has good current carrying characteristics as well as suitable spring characteristics. A bumper spring 26 serves to limit travel of structure 10 towards end housing 19. This spring is tailored to reduce the shock of the magnetic structure as it bottoms at the end of its stroke, after its separates from the keeper assembly. This spring may be a garter spring, a Belleville washer, a spring made of a resilient material such as stiff plastic, or a short coil spring. It also serves to help to reset the device after a severe shock.

A second end housing 29 is connected to housing 14 by screw-thread attachment 30. These screw thread arrangements allow ready and convenient adjustment of the housing components. The keeper 13 is a split keeper and is made up of three sectoral portions 13a, 13b and 13c. (see particularly FIG. 2). Sectors 13a and 13b are rigidly connected to end housing 29 by bolts 31 (31a and 31b in FIG. 2) but 13c is not and is free to move away from end housing 29. Sectors 13a and 13b are edged with a non-magnetic layer 32 of a suitable material e.g. bakelite. This layer provides a smooth bearing surface, a spacer, and ensures a magnetic gap between sectors.

In operation, if a shock is applied to the device longitudinally i.e. within a wide angle of the appropriate axial direction, the magnetic structure (structure 10, magnet 11, coil 13 and keeper sector 13c) acting as an inertial mass tends to travel in the housing on the garter spring bearings against some magnetic force and the back pressure of leaf spring 21 towards end housing 19. The keeper sectors 13a and 13b because they are fixed to the end housing, will be separated from the magnetic structure. At this point a small electrical pulse is generated in the coil. The magnetic structure, if the shock is severe enough continues to move and can freely do so until a lip 34 cut or formed in the outer edge of keeper sector 13c makes contact with the end housing 14, acting as a limit stop. At this point the keeper 13c is stopped and the magnet assembly separates from it. A strong electrical pulse is generated in the coil. The magnet assembly may then move on the springs until it bottoms against bumper spring 26. The bumper spring stores momentarily the remaining kinetic energy in the magnetic assembly and then returns it as the assembly rebounds helped by the leaf springs and its magnetic attraction making contact again with keeper sector 13c and then keeper sectors 13a and 13b. At this point the unit has completed a cycle and is ready to operate again if required.

If a shock of sufficient magnitude of short duration is applied, the magnet assembly including keeper sector 13c would separate from the keeper sectors 13a, 13b but due to the length of the prestroke (distance d) the magnetic force and the opposing force of the leaf springs, the duration of the shock may not be sufficiently long to bring the keeper sector 13c against the limit stop. If a shock force of sufficient magnitude to move the magnet but of longer duration is applied, the magnetic assembly would separate from keeper sectors 13a and 13b and move until the main keeper 13c was against the limit stop but there could be insufficient energy to cause separation of the main keeper.

Figure 3:
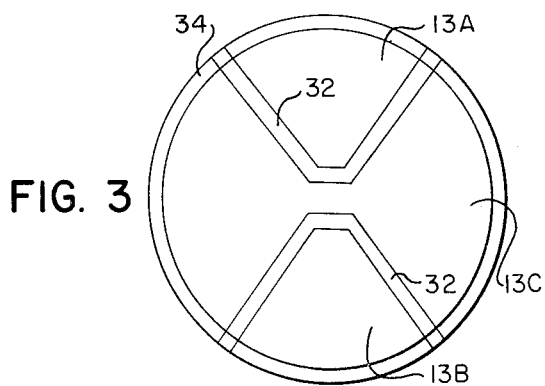
FIG. 3 shows the split keeper assembly.
Figure 4:
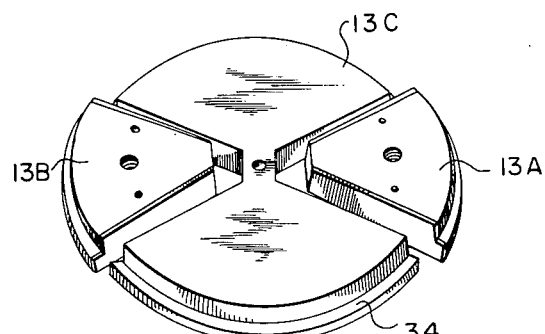
FIG. 4 is an exploded view of the split keeper assembly.
Figure 5:
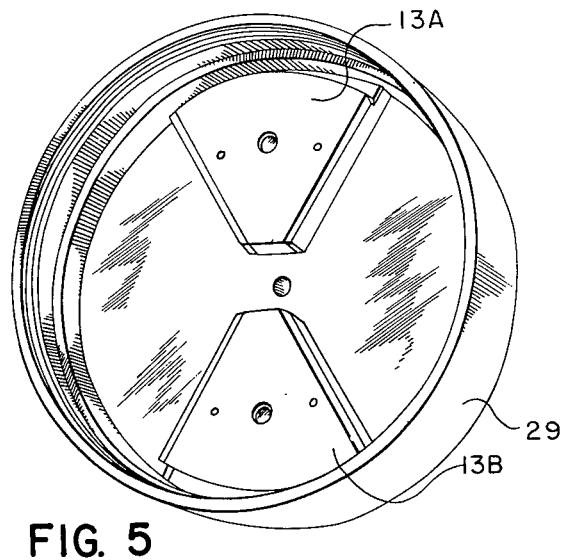
FIG. 5 is a veiw of the end housing to which segments of the keeper are fixed.

FIGS. 3, 4 and 5 show the design of the split keeper assembly more clearly. The design of the keeper is such as to provide the following characteristics and advantages:

1. Different areas of the keeper to be separated from the magnet at a specified time.
2. Different areas of the keeper to be separated from the magnet at a specified distance.
3. The shaping of the parts of the keeper to prevent movement of the magnet, due to vibration, on the keeper.
4. The fastening of one part or parts of the keeper to the case that houses the magnet.

5. The remaining parts of the keeper to be left on the magnet and be free to move with the magnet.
6. The keeper to be divided into areas that will require a predetermined force to separate them from the magnet.
7. The keeper to be of suitable thickness to achieve predetermined separation behaviour.

These features provide a design of keeper that has the ability of separating elected parts of the keeper from the magnet at a predetermined time and distance when the unit is subjected to a shock load. It provides a design of keeper that will prevent movement or vibration between the keeper and the magnet under normal driving conditions. It provides a means of holding the magnet in position during normal operating conditions of the vehicle in which it is mounted. This is accomplished by fastening part of the keeper to the case. It provides a means of tailoring the size thickness, or area of the part of the keeper that is fastened to the case so that it will hold the magnet in place until a certain shock load is exceeded. It provides a means of creating a predetermined length of prestroke and magnetic restraint on the magnet, after the first part or parts of the keeper are separated from the magnet, and before the remaining part or parts of the keeper (the main keeper) are separated from the magnet. This length of prestroke coupled with the magnetic attraction and return spring force function determines the severity of shock required to cause the moving magnet to separate from the main keeper when its overhang contacts the stop provided on the cylindrical housing. It also provides the ability to select a predetermined shock severity required to separate the magnet from the main keeper by changing the relative keeper areas or thicknesses and thereby increasing or decreasing the shock severity required to separate the magnet from the main keeper with enough velocity to produce a powerful electrical pulse.

FIGS. 6, 7 and 8 show the magnet assembly in more detail and especially the configuration of the magnet 11, the coil 12, the housing 14, the return leaf springs 21, and garter springs 15 and 16 and the slots or grooves 17 and 18 they fit into. The coil spring roller bearings have the following characteristics and advantages:

1. Linear movement between the magnet core and the case with little or no friction.
2. Will only allow minimal tilting of the magnet core in the case.
3. Differential expansion is allowed between magnet core and case.
4. Side shock loads tolerated.
5. Ease of installation.
6. Ease of fabrication and low cost.
7. Much wider dimensional tolerances than standard ball bearings.
8. A much larger bearing area than the standard ball bearings.

This type of bearing can be easily and cheaply manufactured using much wider dimensional tolerances than the standard ball or roller bearings. It conforms to round shafts and to irregular surfaces very easily. The overall length is not critical as long as it provides smooth operation in service on the magnet core or shaft. It can be made of a small diameter wire. This would make a soft type of bearing than can distort and absorb radial shocks. On installation the coils could be slightly distorted (compressed) between the inner and outer face of the bearing. This type of installation would allow for differential expansion as well as also having the ability to tolerate shock loads. It can also be made of a larger dia. wire with a small coil diameter. This would provide a very rigid bearing in the radial direction and yet be flexible in the circumferential length. This type of bearing provides means of creating a flexible roller bearing that will allow the unit to operate in response to a shock even at a large off-axis direction without increasing the friction between the side of the case and the magnetic core to any appreciable extent. Bearing slot depth should preferably be such that flexing of the coils beyond the yield point does not occur.

The prestroke provides a means of sensing whether the shock load is of sufficient magnitude and of long enough duration to warrant the final separation of the main part of the keeper from the magnet. It provides a means of tailoring the energy that is stored by the moving magnet mass to the size that is required, to separate the main keeper from the magnet. The length of gap created in the main stroke and bumper stroke mainly determines the strength of magnetism in the magnet that will remain in the magnet after repeated separations, of the keeper and the magnet, that is, the strength of the magnet or voltage output can be tailored by increasing or decreasing the length of the main and bumper strokes.

FIG. 9 is an oscilloscope trace of typical experimental results showing the magnitudes and durations of voltage, energy, velocity, and acceleration. Trace A is the voltage output (across a specified resistance) obtained from the generator. At the beginning of the forward prestroke region there is a small voltage pulse generated as shown by the increase in level and when the main forward stroke region is reached a high voltage pulse is produced. After the forward bumper and return bumper stroke, there is a strong reversed voltage pulse produced when the magnetic assembly returns to the main keeper (main reverse stroke) and a smaller pulse when it returns to the second portion of the keeper attached to the end wall. Trace B is a curve showing the energy going into the load. Trace C is the drop in test vehicle velocity and trace D is the deceleration of the vehicle.

FIG. 10 is a typical hysteresis loop of the magnetic assembly. On preliminary magnetization, the magnetization curve goes from point 0 to point 1 if driven into saturation and would normally return to point 2. If there is a small gap in the magnetic path then it would return to point 3 and if a large gap, to point 4. Energy available if demagnetization occurs is a function of the area shown cross-hatched. If repeated action occurs, i.e. the keeper is moved off or on then the maagnetization curve follows the dotted lines M and it will be seen that after recycling of the generator, i.e. when the keepers are on the assembly, the magnetization level is at point 5. It will be seen that the energy available is a function of the area shown double cross-hatched. If the device is then pulsed into saturation, the curve will return via point 1 to point 3 which gives to the device the capability of providing a greater output energy pulse.

The advantages of the complete unit as a shock detector and pulse generator are as follows:

1. It combines into one unit a sensing, signal processing element, and a voltage generating element that does not require any electrical power source to activate it.
2. It can generate its own electrical energy if a very sudden drop in velocity occurs such as that caused by a crash.
3. It cannot generate any appreciable electrical enery under normal driving conditions.
4. It is completely independent of the electrical circuit of the vehicle and is not required to be connected to it.
5. It cannot generate any electrical energy if the vehicle is stationary with the exception of the condition as stated in (6).
6. It can generate electrical energy after the stationary vehicle is hit by another vehicle even when the ignition switch is off.
7. It is capable of rejecting sub crash shocks such as those initiated by the vehicle striking pot holes, railroad tracks, etc.
8. It operates within the time limit requirement of a low or high speed crash.
9. It operates within the shock limit requirements of a crash.
10. There are not moving parts under normal driving conditions.
11. It is relatively free from vandalism and tampering due to its type of construction and intended location in the vehicle.
12. It can reset and operate as a repeatable unit.
13. It can be mounted in various locations such as on the bumpers, by the radiator or near the firewall or can be placed where needed close to each airbag inflator unit.
14. It eliminates the need to use doubtful components such as switches and storage capacitors.
15. It can be used in a steering wheel without the need for slip rings.
16. It remains isolated from the myriad of unpredictable hazards experienced by the automobile electrical system such as sporadic 200 volt pulses, short circuits, polarity reversals and other fault conditions.
17. Unlike systems using switches and vehicle battery power sources, this invention can generate energy that increases with crash severity. One of these units can therefore fire one set of inflators in the early stages of a crash and fire additional inflators when the crash becomes more severe thus accomplishing "staged inlfation" in two or more steps.

We claim:

1. A shock-actuated electrical pulse generator which provides a double threshold discrimination of applied shock level and duration before full electrical pulse generation and which is operative in response to axial components of shock comprising:
   a. a magnetic assembly formed of a cup-shaped portion having a generally cylindrical outer surface and a central rod-shaped portion extending upwardly from the inside bottom of the cup-shaped portion, said assembly including low reluctance material and permanent magnet material portions,
   b. an electric coil positioned in the annular space between the inner surface of the cup-shaped portion and the rod-shaped portion of the magnetic assembly,
   c. a generally flat disc-shaped removable keeper of low reluctance material making magnetic contact with the upper end of the rod-shaped portion of the magnetic assembly such as to form a closed magnetic circuit linking the coil, said keeper being in the form of a first portion and a second portion both of which are capable of acting as a partial keeper closing the said magnetic circuit and inducing a current pulse in the coil when pulled away frm the magnetic assembly, said second portion of the keeper having a projecting edge,
   d. an outer housing structure enclosing the magnetic assembly and keeper having a first inner end wall and a second inner end wall and of such inner dimensions as to define an annular space between the cylindrical outer surface of the magnetic assembly and the cylindrical side walls and provide space for movement of the magnetic assembly axially in the housing over a predetermined travel distance, the said first portion of the keeper being attached to the first end wall,
   e. bearings mounted in the annular space between the cylindrical outer surface of the magnetic assembly and the cylindrical side walls of the housing such that the magnetic assembly can travel smoothly in the axial direction but is constrained in the radial direction.
   f. a spring member mounted between the second end wall of the housing and the end of the magnetic assembly away from the keeper and having a configuration such as to urge the said assembly away from the said end wall,
   g. a limit stop on the inner surface of the housing and positioned in relation to the second portion of the keeper such that when a shock force of sufficient strength and duration is applied to the generator in the appropriate direction, the magnetic assembly, the coil and the second portion of the keeper acting as an inertial mass moves away from the end wall against the spring member separating the first keeper portion from the magnetic assembly and inducing a first electrical current pulse in the coil and travels on the bearings towards the second end wall until the projecting edge of the second keeper portion makes contact with the limit stop forcing it off the moving magnetic assembly and inducing a second much stronger electrical current pulse in the coil, and
   h. electrical leads from said coil to the exterior of the housing.

2. A shock actuated pulse generator as in claim 1 wherein the bearings are at least two continuous garter springs.

3. A shock actuated pulse generator as in claim 1 wherein the spring member is formed as two electrically separate leaf springs of conducting material and connected to act as the said electrical leads carrying current from the coil to the exterior of the housing.

4. A shock actuated pulse generator as in claim 1 further comprising a bumper spring mounted on the second end wall such as to be contacted by the magnetic assembly as it moves towards the limit of its motion in the housing and provide an energy storing function and a rebounding action to the assembly.

5. A shock actuated pulse generator as in claim 4 wherein the bumper spring is made of stiff plastic or rubber material.

6. A shock actuated pulse generator as in claim 4 wherein the bumper spring is a metal spring.

7. A shock actuated pulse generator as in claim 1 wherein the first portion of the keeper is at least one sector shaped component of a size chosen such that only a low energy electrical pulse is generated in the coil when it is separated from the mganetic assembly and the second portion is a sector shaped component of a size chosen such that a very high energy electrical pulse is generated when it is separated at high velocity.

8. A shock actuated pulse generator as in claim 1, wherein the position of the limit stop on the inner surface of the housing is variable such that the prestroke travel distance of the magnetic assembly in the housing is adjustable to meet varying applied shock severity conditions.

9. A shock actuated pulse generator as in claim 2 wherein at least one of the garter springs forms part of the conducting path of a said electrical lead from the coil to the exterior of the housing.

10. A shock actuated electrical pulse generator which provides a threshold discrimination of applied shock level and duration before full electrical pulse generation and which is operative in response to axial components of shock comprising:
   a. a magnetic assembly formed of a cup-shaped portion having a generally cyclindrical outer surface and a central rod-shaped portion extending upwardly from the inside bottom of the cup-shaped portion, said assembly including low reluctance material and permanent magnet material portions,
   b. an electric coil positioned in the annular space between the inner surface of the cup-shaped portion and the rod-shaped portion of the magnetic assembly,
   c. a generally flat removable keeper of low reluctance material making magnetic contact with the upper end of the rod-shaped portion of the magnetic assembly such as to form a closed magnetic circuit linking the coil, said keeper closing the said magnetic circuit and inducing a current pulse in the coil when pulled away from the magnetic assembly and having a projecting edge,
   d. an outer housing structure enclosing the magnetic assembly and keeper having a first inner end wall and a second inner end wall and of such inner dimensions as to define an annular space between the cylindrical outer surface of the magnetic assembly and the cylindrical side walls and provide space for movement of the magnetic assembly axially in the housing over a predetermined travel distance,
   e. bearings mounted in the annular space between the cylindrical outer surface of the magnetic assembly and the cylindrical side walls of the housing such that the magnetic assembly can travel smoothly in the axial direction but is constrained in the radial direction,
   f. a spring member mounted between the second end wall of the housing and the end of the magnetic assembly away from the keeper and having a configuration such as to urge the said assembly away from said second end wall towards the first end wall,
   g. a limit stop on the inner surface of the housing and positioned in relation to the keeper such that when a shock force of sufficient strength and duration is applied to the generator in the appropriate direction, the magnetic assembly, the coil and the keeper acting as an inertial mass moves away from the first end wall against the spring member and travels on the bearings towards the second end wall until the projecting edge of the keeper makes contact with the limit stop forcing it off the moving magnetic assembly and inducing a strong electrical current pulse in the coil, and
   h. electrical leads from said coil to the exterior of the housing.

11. A shock actuated pulse generator as in claim 10 wherein the bearings are at least two continuous garter springs.

12. A shock actuated pulse generator as in claim 10 wherein the spring member is formed as two electrically separate leaf springs of conducting material and connected to act as the said electrical leads carrying current from the coil to the exterior of the housing.

13. A shock actuated pulse generator as in claim 10 further comprising a bumper spring mounted on the second end wall such as to be contacted by the magnetic assembly as it moves towards the limit of its motion in the housing and provide an energy storing function and a rebounding action to the assembly.

14. A shock actuated pulse generator as in claim 13 wherein the bumper spring is made of stiff plastic or rubber material.

15. A shock actuated pulse generator as in claim 13 wherein the bumper spring is a metal spring.

16. A shock actuated pulse generator as in claim 10, wherein the position of the limit stop on the inner surface of the housing is variable such that the prestroke travel distance of the magnetic assembly in the housing is adjustable to meet varying applied shock severity conditions.

17. A shock actuated pulse generator as in claim 11 wherein at least one of the garter springs forms part of the conducting path of a said electrical lead from the coil to the exterior of the housing.

* * * * *